(12) United States Patent
Kurian et al.

(10) Patent No.: US 10,841,363 B2
(45) Date of Patent: Nov. 17, 2020

(54) STREAMING API SUBSCRIPTION WITHOUT LOSS OF EVENTS

(71) Applicant: INTERNATIONAL BUSINESS MACHINES CORPORATION, Armonk, NY (US)

(72) Inventors: John Kurian, Bangalore (IN); Ramya Rajendiran, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 478 days.

(21) Appl. No.: 15/401,407

(22) Filed: Jan. 9, 2017

(65) Prior Publication Data

US 2018/0198837 A1   Jul. 12, 2018

(51) Int. Cl.
*H04L 12/58* (2006.01)
*H04L 29/08* (2006.01)
*H04L 29/06* (2006.01)

(52) U.S. Cl.
CPC .......... *H04L 67/10* (2013.01); *H04L 65/1069* (2013.01); *H04L 65/602* (2013.01); *H04L 65/80* (2013.01); *H04L 67/02* (2013.01)

(58) Field of Classification Search
CPC .................................................. H04L 65/608
See application file for complete search history.

(56) References Cited

U.S. PATENT DOCUMENTS

| 8,150,988 | B2 | 4/2012 | Pardo-Castellote et al. |
| 8,935,432 | B1* | 1/2015 | McGowan ............ H04L 65/605 |
| | | | 709/248 |
| 2001/0049717 | A1* | 12/2001 | Freeman ............... G06F 9/5027 |
| | | | 709/203 |
| 2008/0010087 | A1* | 1/2008 | Daniel ................... G06Q 10/10 |
| | | | 705/2 |

(Continued)

OTHER PUBLICATIONS

Bloomberg, Jason, "Toss Your Cookies: Maintaining State on the Client with REST", ZapThinkTank, http://zapthink.com, Dec. 13, 2012 (3 pages).

(Continued)

*Primary Examiner* — Ario Etienne
*Assistant Examiner* — SM Z Islam
(74) *Attorney, Agent, or Firm* — Brian Restauro, Esq.; Kevin P. Radigan, Esq.; Heslin Rothenberg Farley & Mesiti P.C.

(57) ABSTRACT

A client facility is provided for establishing a subscription to a streaming service provider, without loss of events. The establishing includes generating, by the client, a subscription request to the streaming service provider of events. The generating includes determining, based on an event offset maintained by the client, identifying data of a most-recently received event from the streaming service provider for a topic of the subscription. The identifying data of the most-recently received event from the streaming service provider for the topic is used in customizing the subscription request with a topic configuration which requests the streaming service provider to resume streaming events from the most- (Continued)

recently received event identified in the event offset for the topic. Therefore, an interrupted streaming subscription may be reestablished without loss of events.

17 Claims, 10 Drawing Sheets

(56) References Cited

U.S. PATENT DOCUMENTS

| | | | | |
|---|---|---|---|---|
| 2010/0195974 | A1* | 8/2010 | Zheng | H04N 21/23106 386/343 |
| 2011/0228768 | A1* | 9/2011 | Gelter | H04L 49/90 370/389 |
| 2015/0260030 | A1* | 9/2015 | Wisinger, Jr. | E21B 47/00 702/89 |
| 2016/0147578 | A1* | 5/2016 | Biesack | G06F 9/541 719/328 |
| 2017/0063946 | A1* | 3/2017 | Quan | H04L 67/20 |
| 2017/0242889 | A1* | 8/2017 | Zhao | G06F 16/283 |

OTHER PUBLICATIONS

Apache-Kafka, "Announcing Stack Overflow Documentation", https://cwiki.apache.org/confluence/display/FAFKA/.8.0+SimpleConsumer+Example, posted Dec. 5, 2014 (2 pages).

Wikipedia, "WS-Reliable Messaging", https://en.wikipedia.org/w/index/php?title=WS-ReliableMessaging&oldid=719404804, Last Modified May 9, 2016.

Salesforce, "Force.com Streaming API Developer Guide", Version 37.0, Jun. 2016 (91 pages).

IBM, "z/Architecture Principles of Operation," IBM® Publication No. SA22-7832-10, Eleventh Edition, Mar. 2015, pp. 1-1732.

IBM, "Power ISA™ Version 2.07B," International Business Machines Corporation, Apr. 9, 2015, pp. 1-1527.

* cited by examiner

| STREAMING SERVICE PROVIDER | OBJECT TYPE | ACTION TYPE | LAST PROCESSED TIMESTAMP | CHANGED FIELDS |
|---|---|---|---|---|
| PROVIDER A | ACCOUNT | POST | 2016-01-10T08:00:00.00 0Z | |
| PROVIDER A | ORDER | PUT | 2016-01-10T08:01:00.00 0Z | STATUS, Opp_cause_c |
| PROVIDER B | WORKSHEET | POST | 2016-01-10T07:59:30.00 0Z | |

STREAMING API SUBSCRIPTION WITHOUT LOSS OF EVENTS

BACKGROUND

Real-time application programming interfaces (APIs) are provided by Software as a Service (SaaS) applications for delivery of data to web clients in web real-time. SaaS is a software licensing and delivery model in which software is licensed on a subscription basis and essentially hosted. The model is sometimes referred to as "on-demand software". SaaS is typically accessed by users using a client by a web browser. The real-time APIs model is usually implemented for reading data, building reports, triggering business actions, and is also being used for writes and deletes. SaaS has become a common delivery model for many business applications, including office and messaging software, payroll processing software, DBMS software, management software, CAD software, development software, gamification, virtualization, accounting, collaboration, customer relationship management (CRM), management information systems (MIS), enterprise resource planning (ERP), invoicing, human resource management (HRM), talent acquisition, content management (CM), anti-virus software, and service desk management.

Streaming APIs are a type of real-time API where the servers respond to the clients using long-polling techniques. Streaming APIs often follow an event-driven PubSub model. The approach is different from the traditional polling methods, where clients repeatedly check on the server for updates. Advantageously, streaming APIs provide increased speed over typical polling APIs, as well as avoidance of unnecessary usage of API calls, and use less network resources in general. An advantage that conventional polling APIs provide over streaming APIs is reliability of event delivery.

The ability to provide enhanced reliability of delivery of streaming APIs is therefore an area of interest and continued research for, for instance, establishing commercial advantage in the industry.

SUMMARY

The shortcomings of the prior art are overcome and additional advantages are provided through the provision of a computer-implemented method which includes generating, by a client, a subscription request to a streaming service provider of events. The generating includes determining, based on an event offset maintained by the client, identifying data of a most-recently received event from the streaming service provider for a topic of the subscription, and using the identifying data of the most-recently received event from the streaming service provider for the topic in customizing the subscription request with a topic configuration which requests the streaming service provider to resume streaming events from the most-recently received event identified in the event offset for the topic.

Systems and computer program products relating to one or more aspects are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 5 depicts one embodiment of an event offset table maintained by an offset manager of an events manager of a consuming client, in accordance with one or more aspects of the present invention;

DETAILED DESCRIPTION

Figure 1:
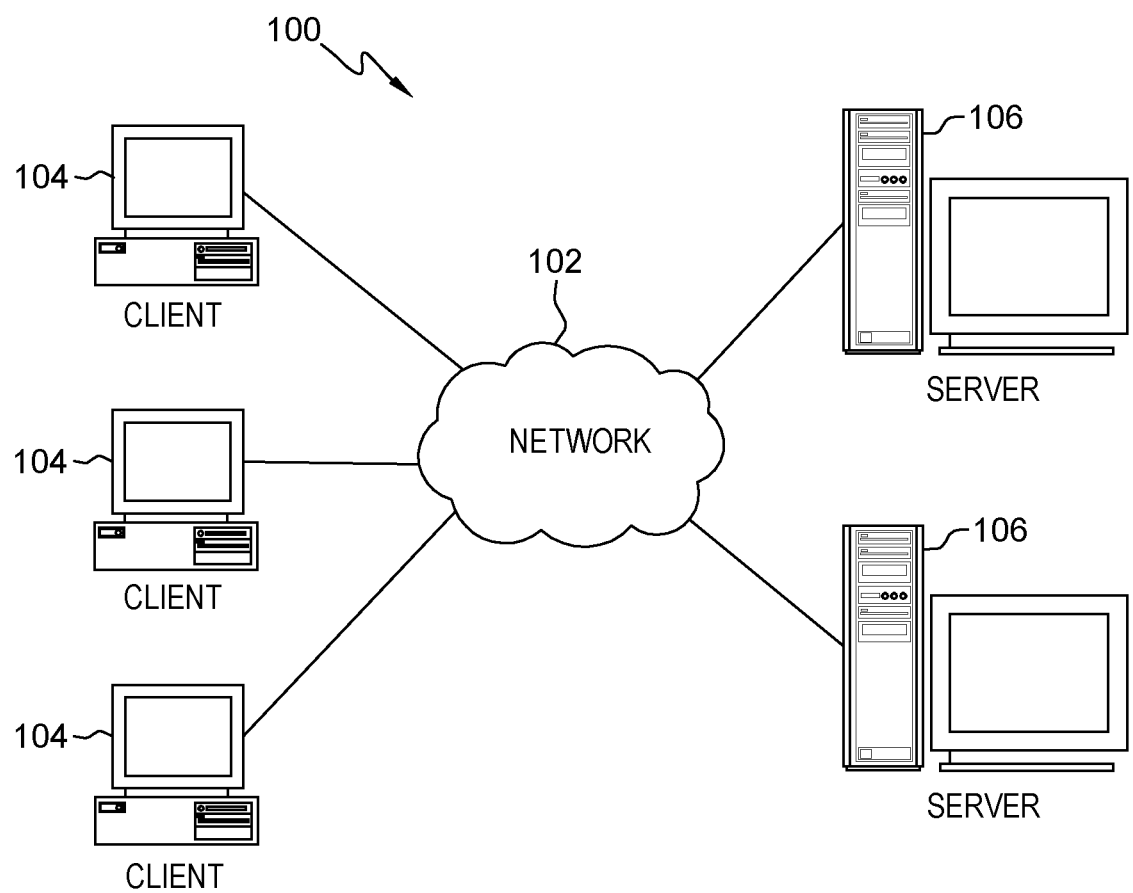
FIG. 1 depicts one embodiment of a network of data processing systems which may implement one or more aspects of the present invention.

FIG. 1 depicts an exemplary diagram of a data processing environment in which aspects of the present invention may be implemented. Note in this regard that FIG. 1 is only exemplary, and is not intended to imply any limitation with regard to the environments in which different aspects of the present invention may be implemented. Many modifications of the depicted environment may be made.

As illustrated in FIG. 1, network processing system 100 may include multiple computers or computing environments, and a network 102. Network 102 may be any medium used to provide communication links between various devices and computers connected together within network data processing system 100. For instance, network 102 may include connections, such as wires, wireless communication links, fiber optic cables, etc.

In the depicted system, one or more servers, or server systems, 106 are connected to network 102, along with one or more clients, or client systems, 104. Clients 104 and servers 106 may be, for example, any type of appropriate computer, computing system, server, etc. In operation, a server 106 may provide data, such as applications, APIs, etc., to one or more clients 104, and further, clients 104 may be clients to multiple servers 106, in one example only.

In one or more embodiments, network data processing system 100 may incorporate, or utilize, the Internet, with network 102 representing a potentially worldwide collection of networks and gateways that use the transmission control protocol/internet protocol (TCP/IP) suite of protocols to communicate with one another. As known, the Internet includes a backbone of high-speed data communication lines between major nodes or host computers, comprising millions of commercial, governmental, educational, and other computer systems, that route data and messages. Of course, network data processing system 100 may also be implemented as a number of different types of networks, such as, for example, an intranet, local area network (LAN), a wide-area network (WAN), a wireless network, etc. Note that FIG. 1 is intended as one example only, and not as an architectural limitation for the different illustrative aspects of the streaming API processing disclosed herein.

As noted, real-time APIs may be provided by SaaS applications for delivery of data to web clients in web real-time. The real-time API model may be implemented for reading data, building reports, triggering business actions, as well as for writes, deletes, etc. Streaming APIs are a particular type of real-time API, where the server responds to the client using long polling techniques. Streaming APIs often follow an event-driven Pub Sub model. This is very different from traditional polling methods, where the clients repeatedly check on the server for updates. Streaming API advantageously provides increased speed over polling APIs, as well as avoiding unnecessary usage of API calls, and use less network resources. A disadvantage of streaming APIs today is reliability of event delivery.

Figure 2:
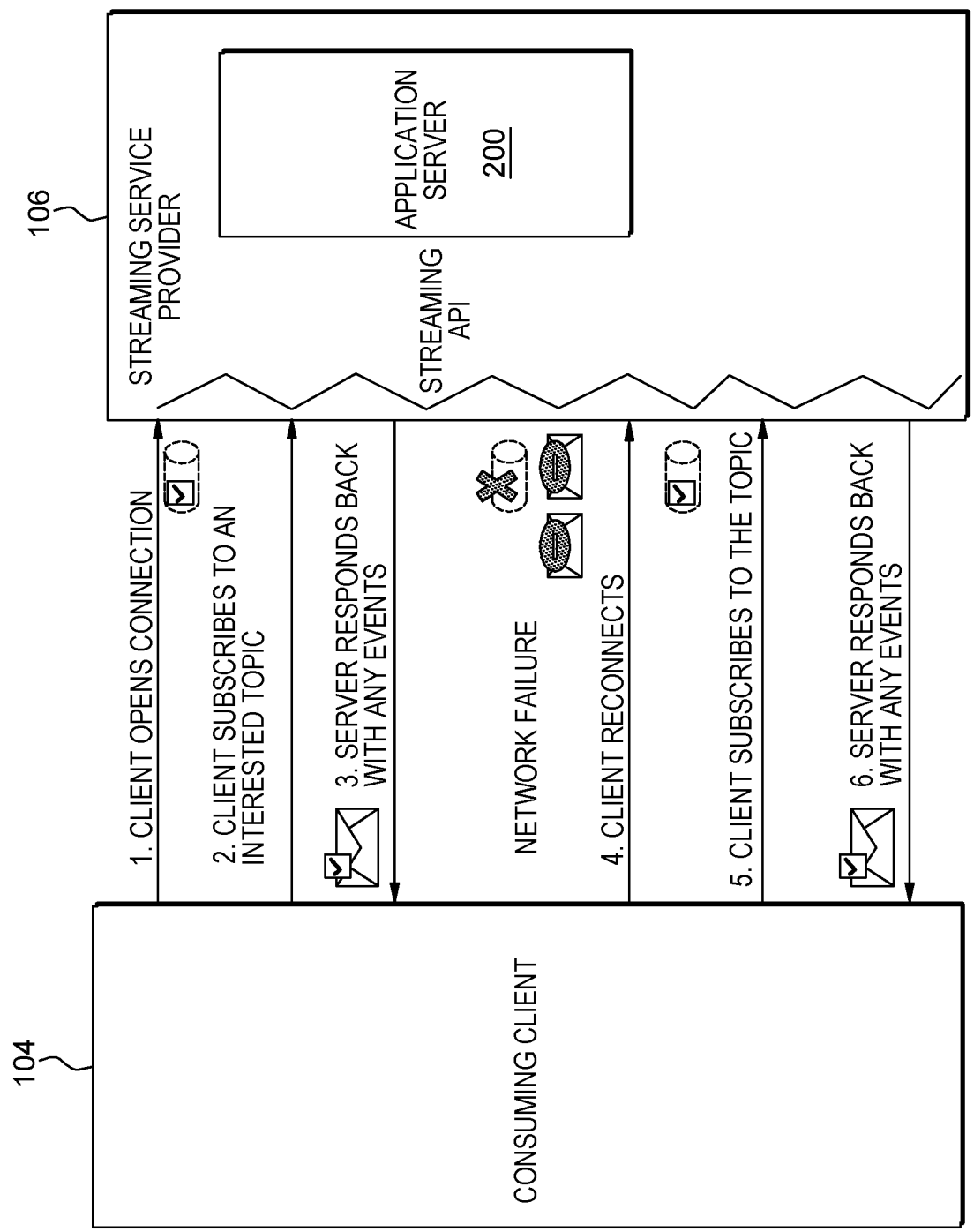
FIG. 2 is a diagram of one embodiment of a subscription and event data flow between a consuming client and streaming service provider, and depicting a network failure requiring the client to re-subscribe to the streaming service provider.

FIG. 2 depicts one embodiment of streaming API processing in a network processing system such as depicted in FIG. 1. In this example, a consuming client 104 opens a connection across a network to a streaming service provider hosted by a server, or server system, 106. This streaming service provider includes an application server 200 which provides the desired streaming API. As illustrated, upon opening the connection, consuming client 104 subscribes to an interested topic. Streaming service provider 106 then sends events for the interested topic back to consuming client 104. In this example, should a network failure occur, which results in interruption of the connection between consuming client 104 and streaming service provider 106, one or more events for the subscribed topic may be lost. After the network failure (for example, after the network failure has been resolved), the client 104 reconnects with streaming service provider 106, and subscribes again to the topic, after which the streaming service provider provides events after the resubscription to the topic. As illustrated in FIG. 2, however, with reconnection and reestablishing of the subscription to the topic, one or more messages have been lost as a result of the network failure.

Maintaining a durable connection between client and server is problematic in streaming APIs. Application servers that provide streaming APIs do not maintain the client state, and sometimes do not even support acknowledgement of successful event delivery (that is, are asynchronous in nature). This can result in loss of events, or event duplication, in certain scenarios. For instance, when a client disconnects due to network failure, and then reconnects, the client typically loses events that happen during the break, or when a client reconnects, duplicate events might be delivered to the client, that is, if the API provider supports historical events being delivered, or when a client has down-time for upgrades and/or maintenance, the client may lose events during that timeframe as well. Such loss of events can result in important data being lost, or being duplicated, depending on the system, which can cause problems or inefficiencies. Addressing this issue, presented herein are enhanced streaming API processing approaches which enable streaming API subscriptions without loss of events, irrespective of interruption in the streaming API connection.

In accordance with one or more aspects of the present invention, the consuming client receiving subscription events maintains an event offset, or event offset table, with identifying data from the received events provided by the streaming service provider. This event offset may include, in one or more embodiments, more than an event ID of a last-received event for the subscription. For instance, the event offset may encompass an intelligent understanding of the resource modeling of SaaS applications available today. In one or more implementations, the identifying data maintained within the event offset by the consuming client may include a generation and/or creation time of the latest-received event per business object type per action type, as explained further herein. The event offset can advantageously be used to detect, for instance, duplicate received events, or to request a streaming service provider to resume a subscription from the point where disconnected, so that no events are lost due to an interruption in a streaming API subscription. Further, in one or more aspects, during a planned down-time, for instance, for maintenance of a consuming client, a secondary client could be brought up, which may share the event offset of the primary consuming client. During the down-time or maintenance of the primary consuming client, the secondary client may continue to update the offset responsive to any received events from the streaming API, and if there is an overlap in time between the two clients, the shared event offset table can be used to avoid duplicate processing of received events.

Real-time APIs are a cutting edge integration technology, with many enterprise applications exposing and adopting real-time APIs and showcasing speed as a differentiating factor. Integrations with streaming APIs react to changes quicker. They are able to engage their clients in real-time, for instance, to build analytics or reports, or to build real-time dashboards, etc. Consuming applications are also starting to use real-time APIs for business critical operations. Reliability and event delivery is therefore an important area to address in streaming APIs. It is important for many applications to obtain accurate data with integrity from their integrations.

Advantageously, applications hosting streaming services are able to deliver events faster, while consuming less resources because they do not maintain any client state. If the client is looking for reliability in processing events, the client may maintain an event offset (i.e., state). This event offset ensures that reliability is obtained, without compromising agility of the streaming service provider. Resource modeling of SaaS applications are not standardized, but from in-depth introspection, have an emerging pattern. The pattern is built into the event offset disclosed herein. Also, the offset modeling discussed can be applied across various SaaS applications. In one or more aspects, processing is provided to avoid event loss due to an interruption in the connection supporting a streaming API subscription.

Generally stated, disclosed herein in one or more aspects are computer-implemented methods, systems, and computer program products, for facilitating reliability of a streaming service provider subscription. The computer-implemented method may include generating, by a client, a subscription request to a streaming service provider of events. The generating may include determining, based on an event offset maintained by the client, identifying data of a most-recently received event from the streaming service provider for a topic of the subscription; and using the identifying data of the most-recently received event from the streaming service provider for the topic in customizing the subscription request with a topic configuration which requests the streaming service provider to resume streaming events from the most-recently received event identified in the event offset for the topic. Note in this regard, that the client may refer, in one or more embodiments, to an intermediary client comprising, for instance, an intermediary programming module tasked with providing a reliable stream of messages from the streaming service provider.

In one or more implementations, once establishing subscription to the streaming service provider, the client tracks received events from the streaming service provider by updating the event offset based on the received events. In one or more embodiments, the streaming service provider may be an SaaS application provider, the subscription may be a streaming API subscription, and the updating may include tracking one or more event topics in the event offset based on the received events. The tracking may include recording in the event offset an identification of an object type of the received event, and an identification of an action type for the object type of the received event. Further, the tracking may include recording a timestamp associated with the received event in the event offset. Thus, the event topic may be identified in the event offset by, at least in part, the timestamp of the most-recently received event for the topic, per object type, and per event type. In one or more specific implementations, the object type may include one or more standard object types, predefined by the streaming service provider, and/or one or more custom object types, defined by the client. An action type may relate to an HTTP method.

In one or more implementations, the computer-implemented method may include determining, by the client, whether a received event from the streaming service provider is a duplicate event. The determining may be based on identifying data in the event offset maintained by the client.

In one or more implementations, the client may be a first client, and the method may include sharing the subscription and the event offset with a second client during an interruption of the first client, such as a scheduled maintenance interruption, and updating, by the second client, the event offset based on received events of the subscription during the interruption of the first client. Once the first client is brought back online, the subscription and event offset may be returned to the first client.

In one or more implementations, generating the subscription request may be based on establishing a client connection to the streaming service provider after disconnection of the client from the streaming service provider, interrupting a previously-established subscription of the client to the streaming service provider for the topic. The subscription request to the streaming service provider may be a streaming API subscription request.

Those skilled in the art should note that an application or program that exposes real-time APIs, such as a streaming API, is referred to herein as a streaming service provider. This can be a completely SaaS application, an on premise application, or a hybrid application. A streaming API may refer to a type of real-time API that provides a long-polling, asymmetric or symmetric API, to send notifications or events on changes to the data of the streaming service provider. An event may be a notification from the streaming service provider.

Reliability of streaming APIs is enhanced by the aspects presented herein, through providing an events manager at a client to maintain the client's event offset based, for instance, on metadata modeling in SaaS applications. With the event offset, a client may re-subscribe to a streaming API by configuring the topic configuration such that the client resumes receiving events from, for instance, a last-received event. In one or more implementations, with each connection or reconnection, the events manager facilitates tailoring the subscription topic or configuration based on identifying data or values in the event offset table of the client.

Figure 3A:
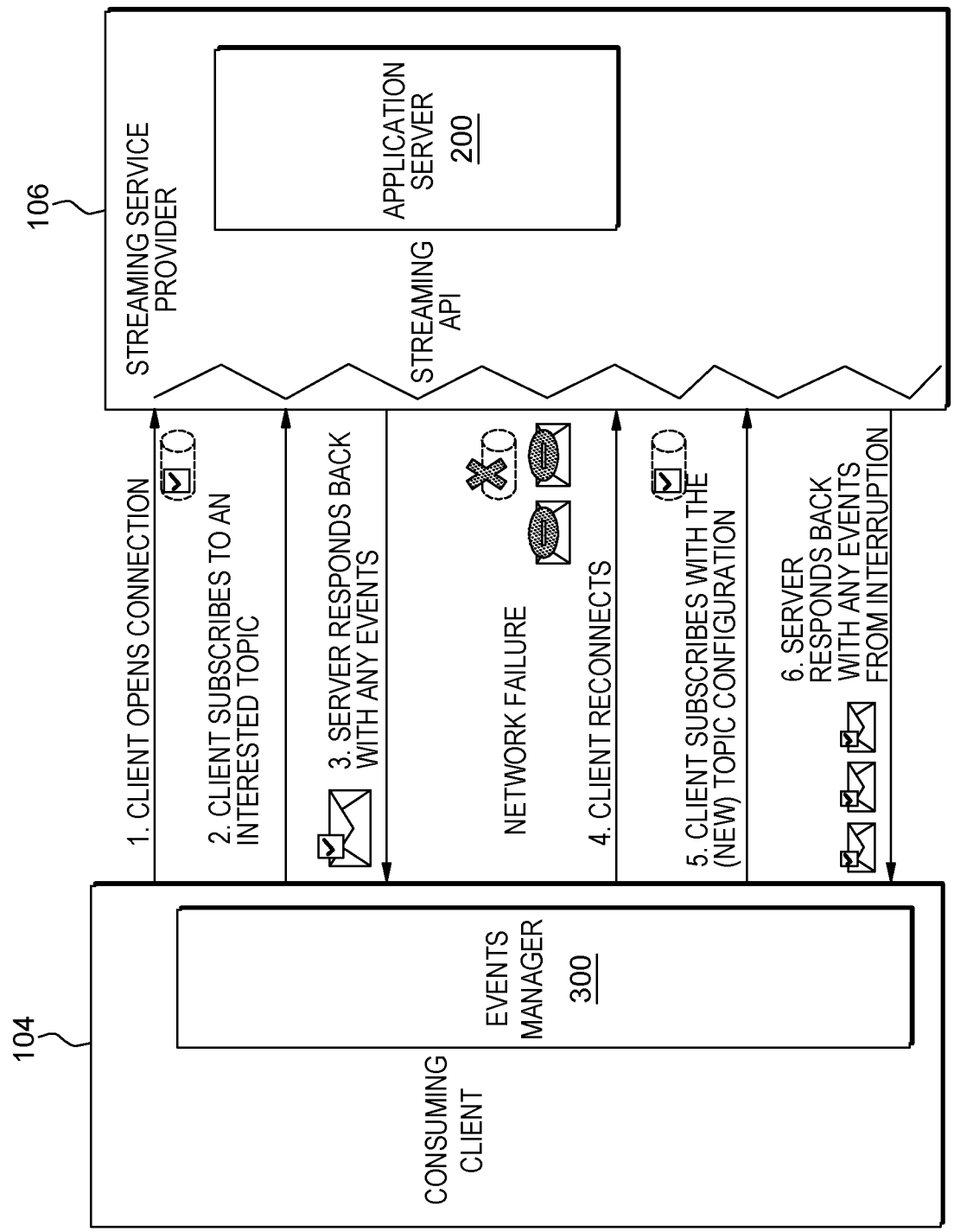
FIG. 3A depicts one embodiment of data flow between a consuming client and streaming service provider, where a network failure results in the client re-subscribing to the streaming service provider with a topic configuration ascertained from an event offset table maintained at the client, in accordance with one or more aspects of the present invention.
Figure 3B:
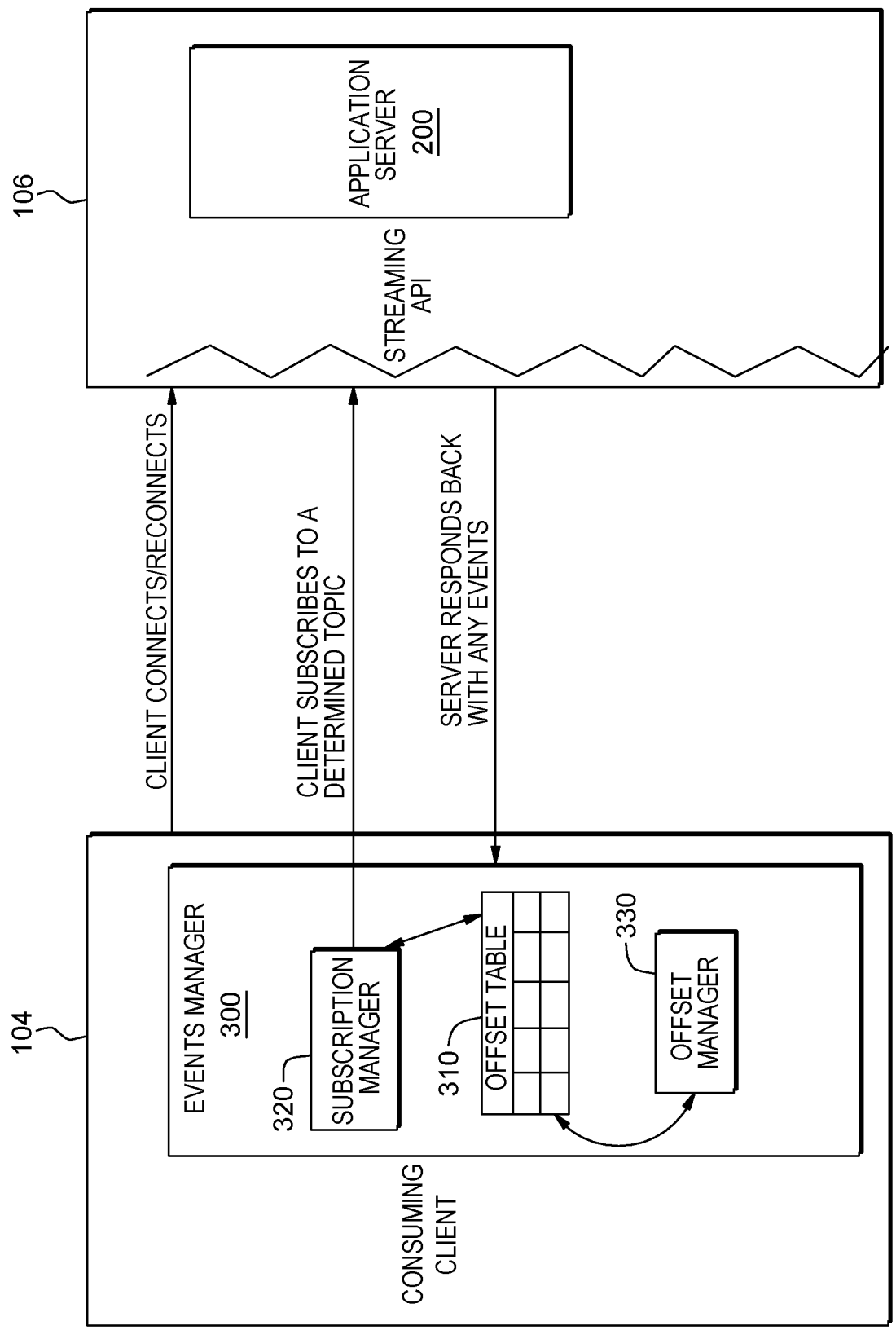
FIG. 3B further depicts a more detailed embodiment of the events manager of the consuming client of FIG. 3A, in accordance with one or more aspects of the present invention.

FIGS. 3A & 3B depict one embodiment of streaming API processing, in accordance with one or more aspects disclosed herein, where a consuming client 104 includes an events manager 300, which facilitates subscribing to a determined topic, and which tracks received events, for instance, in an event offset, as described herein. FIG. 3B depicts one embodiment of events manager 300, which may include an event offset table 310, a subscription manager 320, and an offset manager 330.

In operation, consuming client 104 opens a connection across a network to a streaming service provider, or application server 200, hosted by server 106, which provides a desired streaming API. By way of example, streaming API may use the HTTP/1.1 Request-Response model, and the Bayuex protocol, or any equivalents. A Bayuex client connects to a streaming API in three stages, the first of which includes sending a handshake request. Once the handshake request is satisfied, a connection is opened, and the client 104 sends a subscription request to a channel or interested topic. In one or more implementations, once established, the subscription uses long-polling to push events to the client.

As noted, in one or more embodiments, the subscribing is facilitated by subscription manager 320, which determines, with reference to event offset table 310, identifying data of a most-recently received event from the streaming service provider for a topic of the subscription. If there is no entry in the event offset table for the streaming service provider, then subscription manager 320 may simply configure the topic to subscribe with the inputs to event manager 300. Thus, in one or more implementations, the subscription manager controls subscribing to the streaming service provider each time that the client connects or reconnects to the streaming service provider. The subscription manager configures the topic, and the details on the topic, based on the event offset table values for the streaming service provider. If there is no entry in the offset table for the streaming service provider, then the subscription manager may simply configure the topic to subscribe for events with the inputs to the event manager. If there is already an entry in the event offset table for the streaming service provider, then the subscription manager may configure the topic request using, for instance, the timestamp values for the specified object and action. The subscription manager would then send the subscription request to the streaming service provider. The client could subscribe to one or more topics based on what modularity the streaming service provider supports for topics.

Once the connection and subscription are established, streaming service provider 106 sends events for the interested topic back to consuming client 104, and in particular, to events manager 300, in order that offset management 330 may update the identifying data in event offset table 310. In certain embodiments, the offset manager controls the entries in the event offset table. For example, for every event successfully received from the streaming service provider, the offset manager updates the last-processed timestamp for the object type and action type that the event is related to. The offset manager will also take care of clearing the offset table of old values using any logic appropriate for the client.

With the streaming API processing of FIGS. 3A & 3B, should, for instance, a network failure occur, there is again an interruption between the consuming client 104 and streaming service provider 106, during which time, one or more events for the subscribed topic will not be forwarded. After the network failure, for example, after the network failure has been resolved, client 104 reconnects with streaming service provider 106, and subscribes again to the topic, but with a new topic configuration, tailored with reference to the identifying data in the event offset table 310 of events manager 300. With the new subscription, consuming client 104 requests events be forwarded from the time of interruption of the prior subscription, that is, requests that events be forwarded from the last-received event processed by events manager 300. Server 106 responds back with any events from the last-received event by the client. In this manner, the streaming API processing presented advantageously ensures reliability of event delivery, notwithstanding interruption in the original streaming API subscription.

Figure 4:
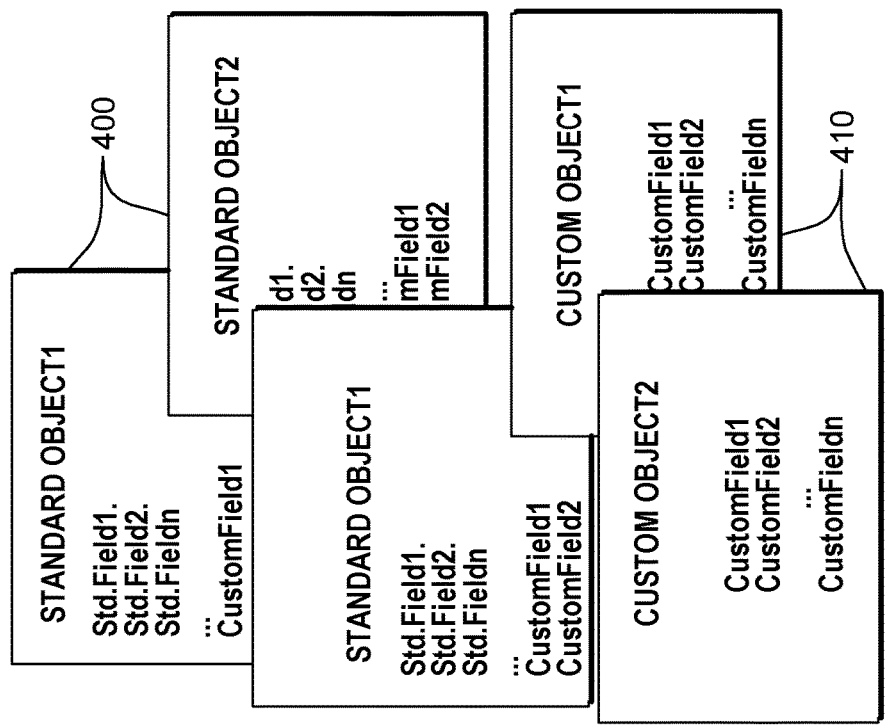
FIG. 4 illustrates one embodiment of various possible topic subscriptions for streaming APIs, which are object-type and action-type based, the configuration of which may be tracked by the client in an event offset table, in accordance with one or more aspects of the present invention.

As illustrated in FIG. 4, resources on streaming service providers (such as an event topic) may often be modeled as standard 400 and custom 410 object types. Standard object types are types that are predefined by the service provider, and may be industry-specific. For instance, Salesforce® provides predefined, standard object types, like order, account, customer, etc., which are specific to the CRM industry. Google® provides standard object types, such as worksheet, spreadsheet, row, column, etc., for its spreadsheet-related functions. Additionally, a client can create custom field on these standard object types that represent the customer's business logic. The customer may also define complete custom object types as appropriate for its particular business. Most SaaS applications have a standard approach to exposing standard and custom object types.

Additionally, an action type 420 may be associated with each object type. The action types relate to, for instance, an HTTP method. For instance, ReStful APIs are a widely used application programming interface. In a ReStful service, the functionality of the service provider may be exposed as HTTP methods—POST, PUT, PATCH, GET, DELETE, and others. Semantically, any search or query or retrieve relation functionality may be exposed by HTTP GET. Upsert or update related functionality may exposed via HTTP PUT, or PATCH. Delete functionality may be exposed via HTTP DELETE, etc.

One embodiment of an event offset 310 is depicted in FIG. 5, where the columns include (by way of example only) an identification of the streaming service provider, an object type identification, an action type identification, a last-processed timestamp, as well as a changed fields category. As noted, topic subscriptions for streaming APIs may be object and action based, and a client may subscribe to a topic which specifies which object type it is interested in, plus which type of action. For instance, a client may subscribe to a topic it is only interested in POST-ON order types. That is, whenever a new order is created, a business event would be created. Certain streaming APIs also allow users to create topics that identify specified fields, whether for a standard or custom object, that it is interested in, as noted above. The maintained timestamp may be that of a last-processed and received event, for instance, per object, per action type.

More particularly, in event offset 310 of FIG. 5, the streaming service provider may be a unique name of the streaming service provider. The object type may be a standard or custom object type, and the action type may be one of the HTTP methods. The last-processed timestamp may be a creation timestamp of the last event that was successfully processed by the consuming client. This timestamp may be part of the event generated by the streaming service provider. The changed fields category may allow the client to configure the subscription topic for a subset of fields in the object type. The object type, action type, and changed fields may be obtained from the subscription topic, while the last-processed timestamp may be obtained from the business event.

Figure 6:
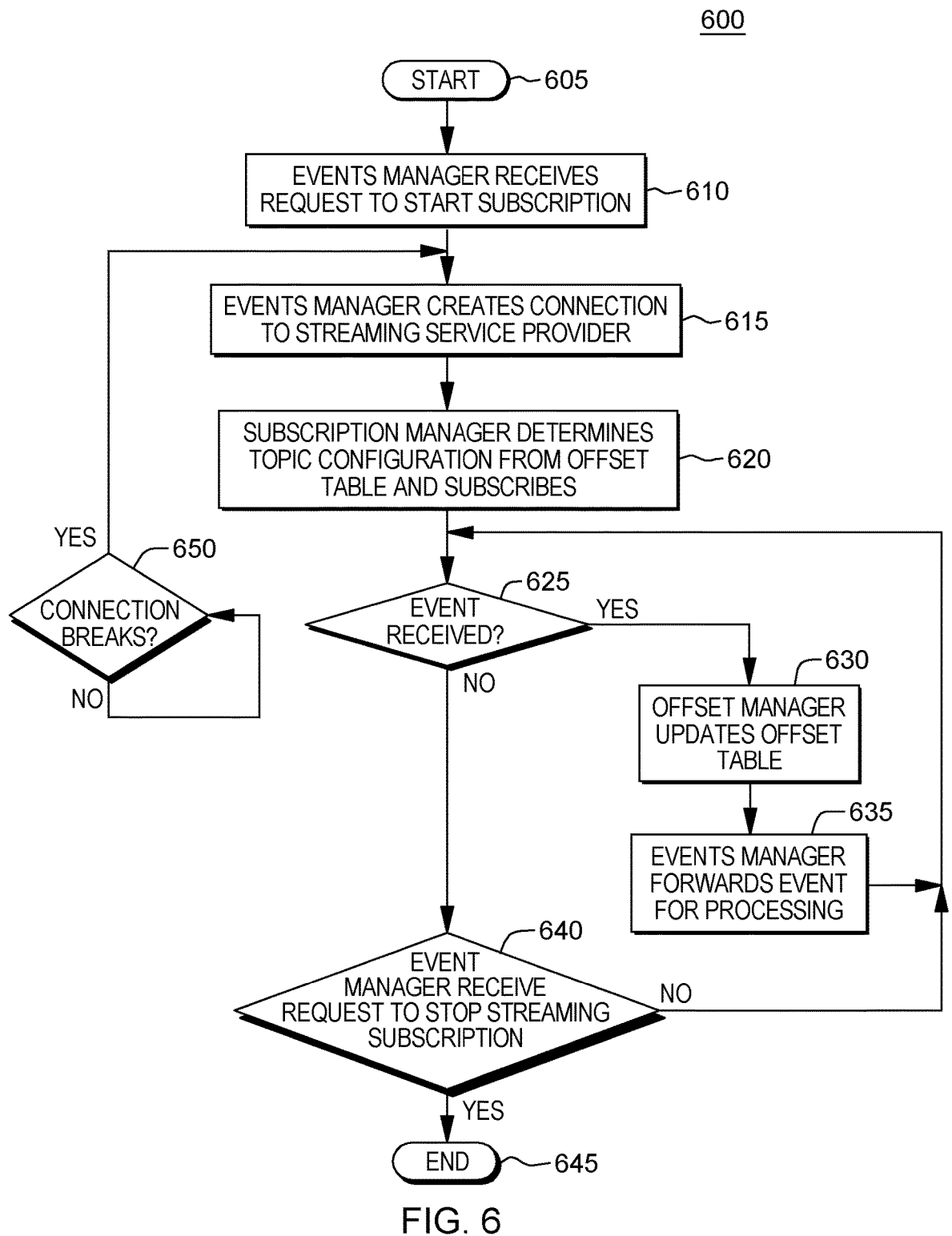
FIG. 6 depicts one embodiment of a process for managing subscription events at a client, and for reestablishing an interrupted subscription by the client, in accordance with one or more aspects of the present invention.

FIG. 6 is an overview process of one embodiment of streaming API processing, in accordance with one or more aspects of the present invention. The process, generally denoted 600, once started in STEP 605 begins with the events manager receiving a request to start a subscription in STEP 610. The events manager creates a connection to the streaming service provider in STEP 615, and the subscription manager determines the topic configuration from the event offset table and subscribes to the streaming service provider in STEP 620. Processing determines whether an event is received in STEP 625. If "yes", then the offset manger updates the offset table in STEP 630, and the events manager forwards the event for processing by the client in STEP 635. If no event is received, then processing determines whether the event manager receives a request to stop the streaming API subscription in STEP 640. If "no", processing waits for a next event to be received. Otherwise, the subscription is terminated in STEP 645. At any time in the process 600, a connection or subscription may break or be interrupted in STEP 650. If this occurs, then processing returns to STEP 615, where the events manager creates a new connection to the streaming service provider, and the subscription manger determines a new topic configuration from the event offset table, and subscribes to the streaming service provider based thereon.

Exemplary embodiments of computing environments to implement one or more aspects of the present invention are described below with reference to FIGS. 7-9.

Figure 7:
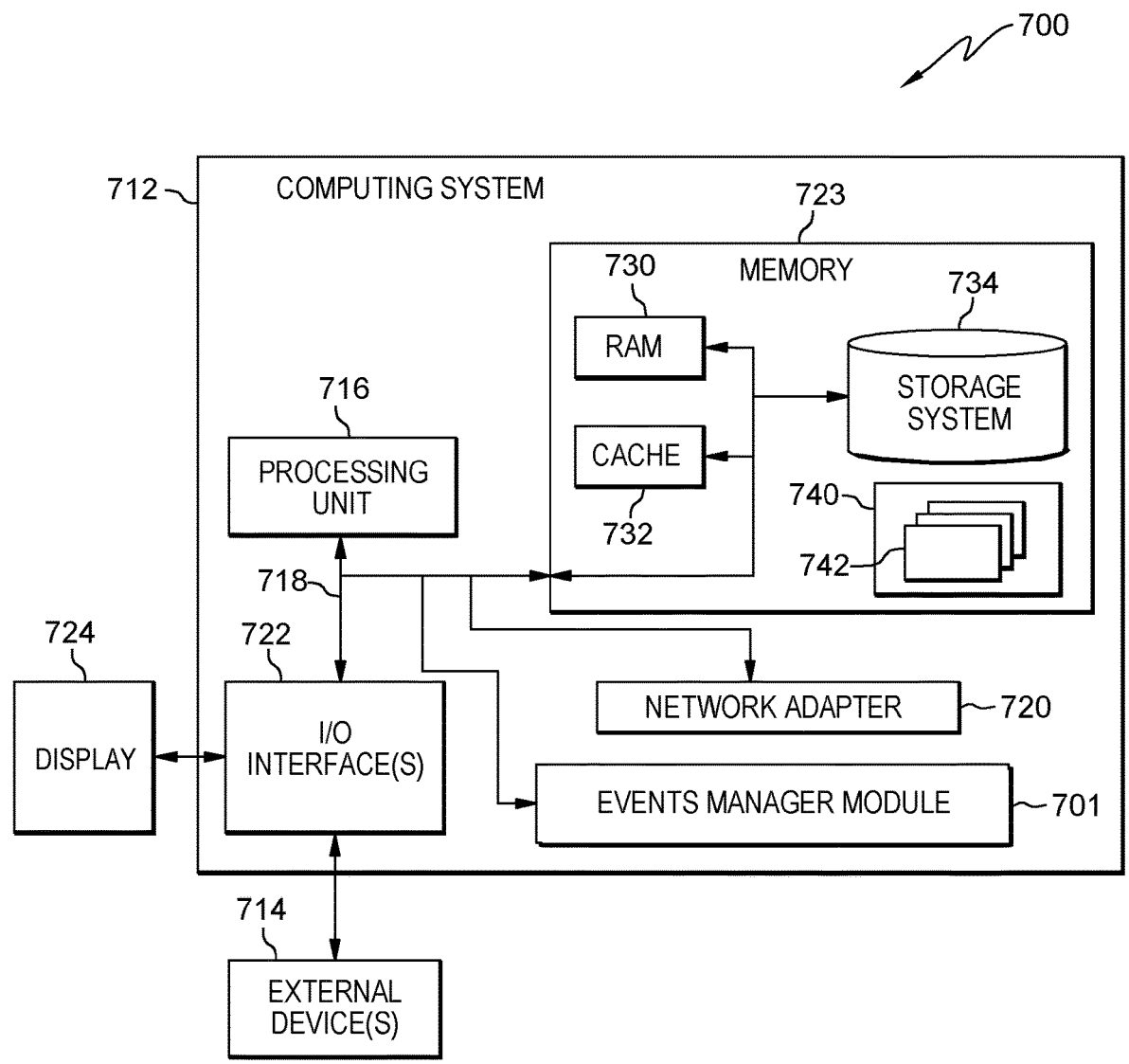
FIG. 7 is a block diagram of a data processing system in which an events manager module or system may be implemented, in accordance with one or more aspects of the present invention.

By way of further example, FIG. 7 depicts one embodiment of a computing environment 700, which includes a computing system 712. Examples of well-known computing systems, environments, and/or configurations that may be suitable for use with computer system 712 include, but are not limited to, a wireless computer, a handheld or laptop computer or device, a mobile phone, a programmable consumer electronic device, a tablet, a personal digital assistant (PDA), and the like.

Computing system 712 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 7, computing system 712, is shown in the form of a general-purpose computing device. The components of computing system 712 may include, but are not limited to, one or more processors or processing units 716, a system memory 723, and a bus 718 that couples various system components including system memory 723 to processor 716.

In one embodiment, processor 516 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 712 may include a variety of computer system readable media. Such media may be any available media that is accessible by computing system 712, and it includes both volatile and non-volatile media, removable and non-removable media.

System memory 723 can include computer system readable media in the form of volatile memory, such as random access memory (RAM) 530 and/or cache memory 732. Computing system 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 718 by one or more data media interfaces. As described below, memory 723 may include at least one program product having a set (e.g., at least one) of program modules that are configured to carry out the functions of embodiments of the invention.

Program/utility 740, having a set (at least one) of program modules 742, may be stored in memory 732 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein. Alternatively, a separate, processing unit reassignment system, module, logic, etc., 701 may be provided within computing environment 712.

Computing system 712 may also communicate with one or more external devices 714 such as a keyboard, a pointing device, a display 724, etc.; one or more devices that enable a user to interact with computing system 712; and/or any devices (e.g., network card, modem, etc.) that enable computing system 712 to communicate with one or more other computing devices. Such communication can occur via Input/Output (I/O) interfaces 722. Still yet, computing system 712 can communicate with one or more networks such as a local area network (LAN), a general wide area network (WAN), and/or a public network (e.g., the Internet) via network adapter 720. As depicted, network adapter 720 communicates with the other components of computing system, 712, via bus 718. It should be understood that although not shown, other hardware and/or software components could be used in conjunction with computing system 712. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 7. Computer system/server 712 of FIG. 7 may be practiced in distributed cloud computing environments where tasks are performed by remote processing devices that are linked through a communications network. In a distributed cloud computing environment, program modules may be located in both local and remote computer system storage media including memory storage devices. Computer system/server 712 is capable of being implemented and/or performing any of the functionality set forth hereinabove.

Figure 8:
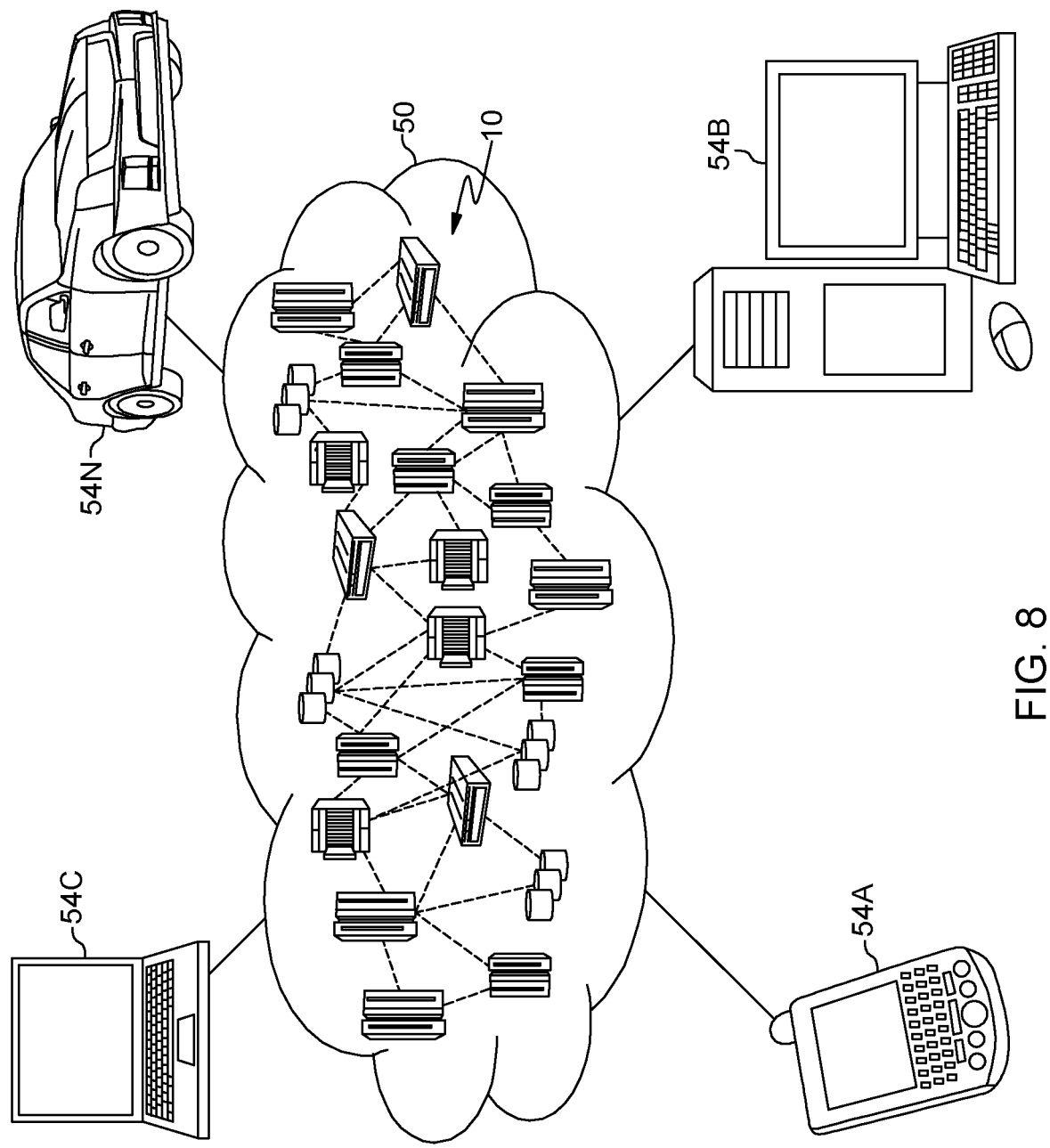
FIG. 8 depicts one embodiment of a cloud computing environment, which may implement or be used in association with one or more aspects of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 9:
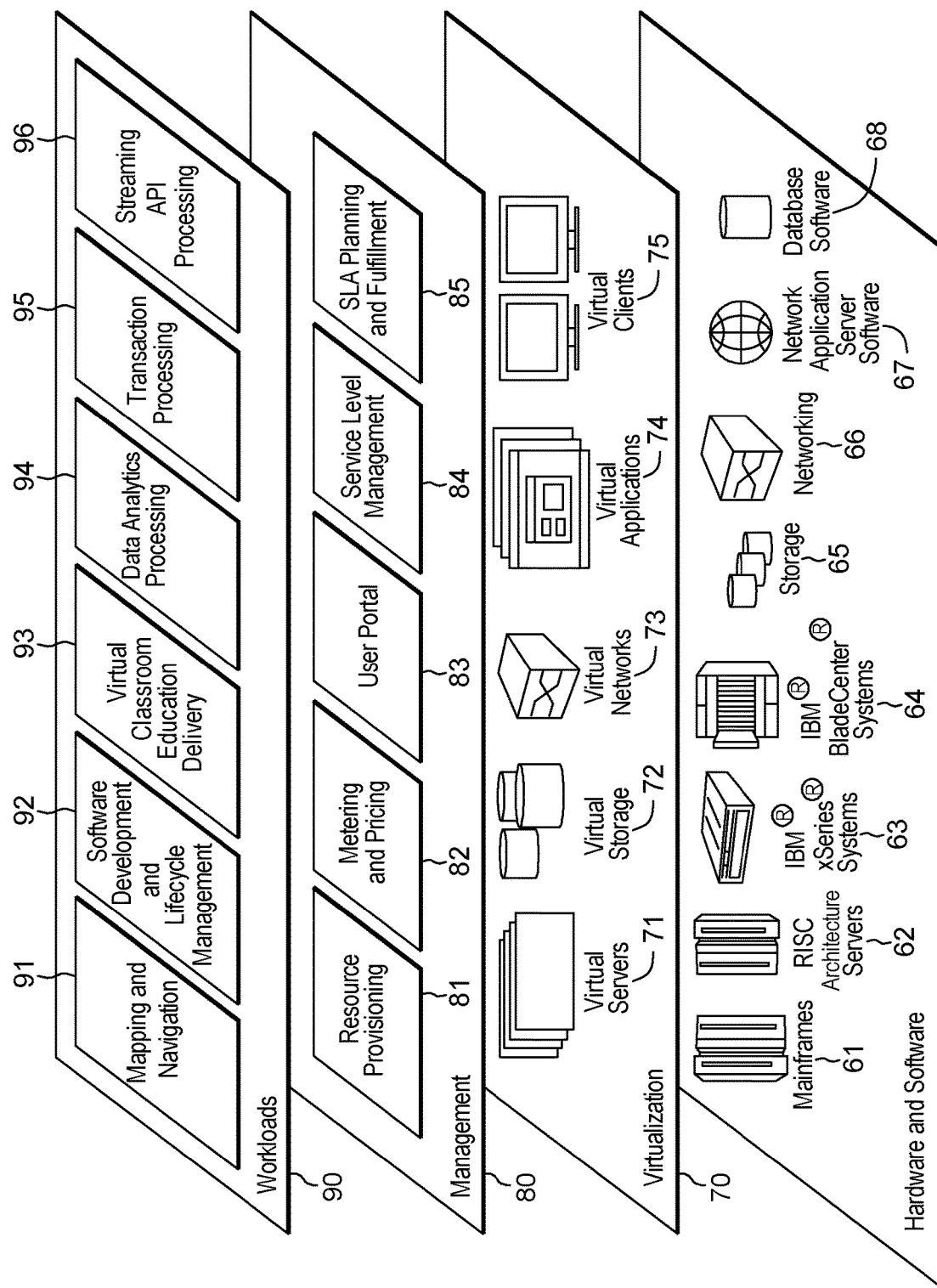
FIG. 9 depicts one example of extraction model layers, which may facilitate or implement one or more aspects of streaming API subscriptions, in accordance with one or more aspects of the present invention.

Referring to FIG. 9, a set of functional abstraction layers provided by cloud computing environment 50 is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized.

Examples of workloads and functions which may be provided from this layer include: mapping and navigation 91; software development and lifecycle management 92; virtual classroom education delivery 93; data analytics processing 94; transaction processing 95; and streaming API processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method comprising:
    connecting, by a client, to a streaming service provider, the connecting enabling the client to subscribe to a topic of a real-time streaming API using an initial topic configuration and receive events for the topic from the streaming service provider;
    based on an occurrence of a connection interruption between the client and the streaming service provider, determining, by the client, that the client was connected to the streaming service provider prior to the connection interruption; and
    reconnecting with the streaming service provider to resubscribe to the topic of the real-time streaming API, the reconnecting including generating, by the client, a subscription request to the streaming service provider of events with a new topic configuration for the events of the topic to be forwarded from a time of the connection interruption, the new topic configuration being different from the initial topic configuration, the generating including:
        accessing an event offset maintained by the client, the event offset comprising identifying data of a most-recently received event from the streaming service provider for the topic of the subscription, the identifying data to be included in the new topic configuration, the identifying data including an identification of at least one object type of a plurality of object types, the at least one object type including an industry-related data type; and
        using the identifying data of the most-recently received event from the streaming service provider for the topic in customizing the subscription request with the new topic configuration specifying the at least one object type, wherein the new topic configuration requests the streaming service provider to resume streaming events from the most-recently received event identified, at least in part, by using the at least one object type in the event offset for the topic.

2. The computer-implemented method of claim 1, further comprising, once establishing subscription to the streaming service provider, tracking by the client received events from the streaming service provider, the tracking comprising updating the event offset based on the received events.

3. The computer-implemented method of claim 2, wherein the streaming service provider is a SaaS application provider, and the updating comprises tracking one or more event topics in the event offset based on the received events, the tracking further comprising recording in the event offset an identification of at least one action type of a plurality of action types for the at least one object type of the most-recently received event, the at least one action type being selected from HTTP method action types related to service provider functionality.

4. The computer-implemented method of claim 2, further comprising determining, by the client, whether a received event from the streaming service provider is a duplicate event, the determining being based on data of the event offset.

5. The computer-implemented method of claim 2, wherein the client is a first client, and the method further comprises:
    sharing the subscription and the event offset with a second client during the connection interruption of the first client; and
    updating, by the second client, the event offset based on received events of the subscription during the connection interruption of the first client.

6. The computer-implemented method of claim 3, wherein the tracking further comprises recording a timestamp associated with the received event in the event offset, the event topic being identified in the event offset by, at least in part, the timestamp of the most-recently received event for the topic, per object type and per action type.

7. The computer-implemented of claim 3, wherein the HTTP method action types are selected from the group consisting of HTTP POST, HTTP PUT, HTTP PATCH, HTTP GET, HTTP HEAD and HTTP DELETE.

8. The computer-implemented method of claim 1, wherein the object type includes an industry-specific standard object type predefined by the streaming service provider.

9. The computer-implemented method of claim 1, wherein the industry-related data type includes a client-customized object type defined by the client, the client-customized object type including a customized field of a particular business logic of the client.

10. The computer-implemented method of claim 9, wherein the client-customized object type modifies a standard object type predefined by the service provider.

11. A system comprising:
a memory; and
a processing unit communicatively coupled with the memory, wherein the system performs a method comprising:
connecting, by a client, to a streaming service provider, the connecting enabling the client to subscribe to a topic of a real-time streaming API using an initial topic configuration and receive events for the topic from the streaming service provider;
based on an occurrence of a connection interruption between the client and the streaming service provider, determining, by the client, that the client was connected to the streaming service provider prior to the connection interruption; and
reconnecting with the streaming service provider to resubscribe to the topic of the real-time streaming API, the reconnecting including generating, by the client, a subscription request to the streaming service provider of events with a new topic configuration for the events of the topic to be forwarded from a time of the connection interruption, the new topic configuration being different from the initial topic configuration, the generating including:
accessing an event offset maintained by the client, the event offset comprising identifying data of a most-recently received event from the streaming service provider for the topic of the subscription, the identifying data to be included in the new topic configuration, the identifying data including an identification of at least one object type of a plurality of object types, the at least one object type including an industry-related data type; and
using the identifying data of the most-recently received event from the streaming service provider for the topic in customizing the subscription request with the new topic configuration specifying the at least one object type, wherein the new topic configuration requests the streaming service provider to resume streaming events from the most-recently received event identified, at least in part, by using the at least one object type in the event offset for the topic.

12. The system of claim 11, further comprising, once establishing subscription to the streaming service provider, tracking by the client received events from the streaming service provider, the tracking comprising updating the event offset based on the received events.

13. The system of claim 12, wherein the streaming service provider is a SaaS application provider, and the updating comprises tracking one or more event topics in the event offset based on the received events, the tracking further comprising recording in the event offset an identification of at least one action type of a plurality of action types for the at least one object type of the most-recently received event, the at least one action type being selected from HTTP method action types related to service provider functionality.

14. The system of claim 12, further comprising determining, by the client, whether a received event from the streaming service provider is a duplicate event, the determining being based on data of the event offset.

15. The system of claim 13, wherein the tracking further comprises recording a timestamp associated with the received event in the event offset, the event topic being identified in the event offset by, at least in part, the timestamp of the most-recently received event for the topic, per object type and per action type.

16. The system of claim 11, wherein the object type includes an industry-specific standard object type predefined by the streaming service provider.

17. A computer program product for facilitating a streaming service provider subscription, the computer program product comprising:
a computer readable storage medium having computer readable program instructions thereon, the program instructions being readable by a processing circuit to cause the processing circuit to perform a method comprising:
connecting, by a client, to a streaming service provider, the connecting enabling the client to subscribe to a topic of a real-time streaming API using an initial topic configuration and receive events for the topic from the streaming service provider;
based on an occurrence of a connection interruption between the client and the streaming service provider, determining, by the client, that the client was connected to the streaming service provider prior to the connection interruption; and
reconnecting with the streaming service provider to resubscribe to the topic of the real-time streaming API, the reconnecting including generating, by the client, a subscription request to the streaming service provider of events with a new topic configuration for the events of the topic to be forwarded from a time of the connection interruption, the new topic configuration being different from the initial topic configuration, the generating including:
accessing an event offset maintained by the client, the event offset comprising identifying data of a most-recently received event from the streaming service provider for the topic of the subscription, the identifying data to be included in the new topic configuration, the identifying data including an identification of at least one object type of a plurality of object types, the at least one object type including an industry-related data type; and
using the identifying data of the most-recently received event from the streaming service provider for the topic in customizing the subscription request with the new topic configuration specifying the at least one object type, wherein the new topic configuration requests the streaming service provider to resume streaming events from the most-recently received event identified, at least in part, by using the at least one object type in the event offset for the topic.

* * * * *